United States Patent [19]

Schuma

[11] Patent Number: 4,758,090
[45] Date of Patent: Jul. 19, 1988

[54] OPTICAL WAVELENGTH MONITOR USING BLAZED DIFFRACTION GRATING

[75] Inventor: Richard F. Schuma, Kinnelon, N.J.

[73] Assignee: Allied-Signal Inc., Morris Township, Morris County, N.J.

[21] Appl. No.: 911,562

[22] Filed: Sep. 25, 1986

[51] Int. Cl.[4] .................. G01B 9/02; G01C 19/64; H01S 3/10
[52] U.S. Cl. .................... 356/350; 350/320; 372/32
[58] Field of Search .................. 356/350; 372/32; 350/162.22, 162.23, 320

[56] References Cited

U.S. PATENT DOCUMENTS

| | | | |
|---|---|---|---|
| 4,227,769 | 10/1980 | Phillips et al. | 350/162.22 X |
| 4,299,490 | 11/1981 | Cahill et al. | 356/350 |
| 4,330,175 | 5/1982 | Fujii et al. | 350/162.22 |
| 4,485,475 | 11/1984 | Large et al. | 372/32 |

FOREIGN PATENT DOCUMENTS

| | | | |
|---|---|---|---|
| 107373 | 5/1984 | European Pat. Off. | |
| 55-93103 | 7/1980 | Japan | 350/320 |
| 61-35328 | 2/1986 | Japan. | |
| WO85/04530 | 10/1985 | PCT Int'l Appl. | 372/32 |

Primary Examiner—Vincent P. McGraw
Attorney, Agent, or Firm—Howard G. Massung

[57] ABSTRACT

A wavelength monitor (25) uses a diffraction grating (35) and a beam splitter (31). Light from a superluminescent diode (SLD) is supplied to the beam splitter (31) and is projected onto the grating (35).

The grating is formed by holographically projecting a diffraction pattern onto a polished surface which is then photoetched, thereby creating a blazed diffraction grating corresponding to the projected pattern. The etched grating is used as a master, wherein the etched grating is coated with reflective material. The reflective material is then transferred to a prepared substrate that has an ultra-low thermal expansion coefficient to form a low cost replica diffraction grating. The grating (35) formed in this manner becomes a very stable and efficient dispersive element that forms a spectrum of the SLD output that is free of ghost images and accurately deproduces the spectral distribution. A pair of optical sensors (41, 42) detect an imbalance in reflected light, providing an indication of wavelength deviation.

13 Claims, 2 Drawing Sheets

OPTICAL WAVELENGTH MONITOR USING BLAZED DIFFRACTION GRATING

FIELD OF THE INVENTION

This invention relates to light wavelength measurement, and more specifically to an optical wavelength monitor which is used to determine the mean wavelength of a broadband light source. The invention finds a particular application in fiber optic gyroscopes (FOGs) in which accurate measurement of wavelength shifts of light are desired.

A fiber optic gyroscope suitable for certain applications requires a scale factor stability of several parts per million. This implies that the wavelength of a light source used in the fiber optic gyroscope must be monitored and controlled to an accuracy of approximately one ppm.

A wavelength measurement device which embodies a blazed diffraction grating is described below. This grating functions as a dispersive element to form a spectrum across two contiguous low noise detectors. The difference in power on the two detectors represents the wavelength control signal. The resulting wavelength monitor is compact, thermally and mechanically stable, and contains no active elements, which makes it suitable for operation within a fiber optic gyroscope.

BACKGROUND OF THE INVENTION

The operation of a fiber optic gyroscope (FOG) is based on a discovery by George Sagnac that the rotation of a closed light path produces a relative phase shift between two counter-propogating light beams that traverse the light path. In a FOG, the closed path is in a glass fiber, so the effective sensitivity can be multiplied by using many turns of fiber.

In the FOG's basic optical circuit, the beam from a single optical source is divided in two by a beam splitter. The two resulting beams are directed through a multiturn fiber optic coil in opposite directions to allow the beams to interfere with each other. Rotation of the coil produces Sagnac phase shifts in each beam that have equal magnitudes but opposite signs. Measuring the phase difference between the two optical waves yields the rotation rate, which is linearly proportional to the Sagnac phase shift.

An accurate measurement of rotation rate requires the differential phase shift between the counter-propagating waves to be virtually eliminated from all sources other than rotation. This is a significant technological challenge in a high performance FOG since the differential phase shift that must be measured may be as small as $10^{-7}$ radian or as large as a radian or more. The solution depends upon the two counter-propagating waves following exactly the same optical path, in which case the system is said to be optically reciprocal.

A small fraction of light is scattered by the optic fibers and is recaptured by the fiber and guided in the direction opposite to that of the primary waves. Although the backward waves arise from spatially random scatterers, they can combine within the fiber to constitute coherent waves, which can add to the primary waves and alter their phases. These backward waves do not obey a reciprocity rule as do the primary waves, so when they combine with the primary waves, they can impart errors in the Sagnac phase shift that is termed coherent Rayleigh backscatter noise. One way to reduce the magnitude of this noise is to use a source that is of very short coherence length.

Multimode laser diodes have been used as optical sources in a FOG. A more recent development is the superluminescent diode (SLD) whose principal attributes are very high brightness and short coherence light.

A closed loop FOG uses a nonreciprocal phase shifter (NRPS) in the fiber sensing coil, which applies a controlled amount of differential phase shift to the counterpropagating waves. The NRPS, driven by a servo amplifier, provides a nonreciprocal phase shift that is equal and opposite to the Sagnac phase shift caused by rotation. The net nonreciprocal phase shift in the gyroscope is always zero, and the feedback signal to the NRPS reflects the Sagnac phase shift and thus the rotation rate.

A closed-loop FOG is always kept at the most sensitive operating point on the response curve—the point corresponding to zero rotation rate—because the servo keeps the net nonreciprocal phase shift at zero. This approach provides a linear response when the nonreciprocal phase shift generated by the NRPS is linearly proportional to the feedback signal.

The superluminescent diode, and all semiconductor light sources in general, emit radiation whose wavelength is sensitive to temperature changes In order to increase the stability of a FOG, it is desired that a a wavelength monitor be used that embodies diffraction grating to sense and stabilize such wavelength shifts.

In order to provide a stable output, a diffraction grating must exhibit a high degree of grating contents accuracy. For grating constants that approach the wavelength of light, such accuracy is difficult to achieve. The use of mechanical engravers to produce such gratings produce periodic errors due to the effects of lead screws used on such machines. The periodic errors result in ambiguous wavelength measurements due to scattering and ghost images.

It is therefore desired to provide accurate means for detecting a wavelength shift in a light source such as is used in fiber optic gyros. It is further important to reduce the mechanical complexity of such fiber optic gyros by reducing the complexity of wavelength measurement devices used in the fiber optic gyros thereby further enhancing reliability. It is further important that size and weight of light wavelength sensors be reduced. It is also advantageous if a light wavelength shift sensor has an ability to distinguish between positive and negative wavelength shifts and provides an output that is proportional to the wavelength shift.

SUMMARY OF THE INVENTION

In accordance with the present invention, light from a light source is fed through a beam splitter and collimated onto a blazed diffraction grating. The diffraction grating reflects the light through the collimating lens which refocuses the reflected light back into the beam splitter. A pair of optical detectors are positioned at the beam splitter so that light which is diffracted off-axis results in an unbalanced output between the two optical detectors.

The diffraction grating is mounted on a stable platform in a manner to function in a Littrow configuration to reflect light back to the beam splitter. The light is provided by optical fiber associated with a fiber optic gyroscope (FOG). The arrangement is used to stabilize the wavelength of the light source and thereby allows the FOG to provide accurate measurements of Sagnac phase shifts in order to measure the rotation rate of the FOG.

Light from the light source is transmitted to the monitor by means of a single mode fiber pigtail which is connected to the optical fiber. The emerging light from the pigtail is directed to the grating by a collimating lens element that assures a constant angle of incidence on the grating for all points within the clear aperture. The diffracted light from the grating is retroreflected back through the lens, which focuses the beam. A beamsplitter cube directs the light to a two element silicon detector (bicell) upon which an image of the light source spectrum is formed.

The light source's power spectral density is dispersed across the bicell. The mean of the power spectral density, which is designed to correspond to the blazed wavelength of the grating, is centered between the two elements of the bicell. Under this condition, the outputs of the two detectors will be equal. When the spectral distribution of the light source changes, the mean of the spectrum will be reflected to a point other than the boundary between the two detector elements and the outputs of the detector elements will no longer be in balance. The differential current from the detectors is proportional to the wavelength shift of the light source.

At this point, a control signal can alter the state of the light source in order to return the mean of the spectrum to the desired set point. This can be accomplished by varying the temperature or drive current, or by some other means, which is yet to be defined. The wavelength measurement device and light source's wavelength control system work together in a feedback mode to keep the mean wavelength constant.

The wavelength monitor described above is one which detects the median wavelength of the spectrum. The desired condition of balance in the signal from the two detectors is reached when the powers on the two detectors are equal.

Advantages include increased stability through the avoidance of mechanical adjustments, the use of passive techniques for measuring frequency shift, reduced size and an elimination of ambiguity between positive and negative measured frequency shifts.

DETAILED DESCRIPTION OF THE PREFERRED EMBODIMENTS

Figure 1:
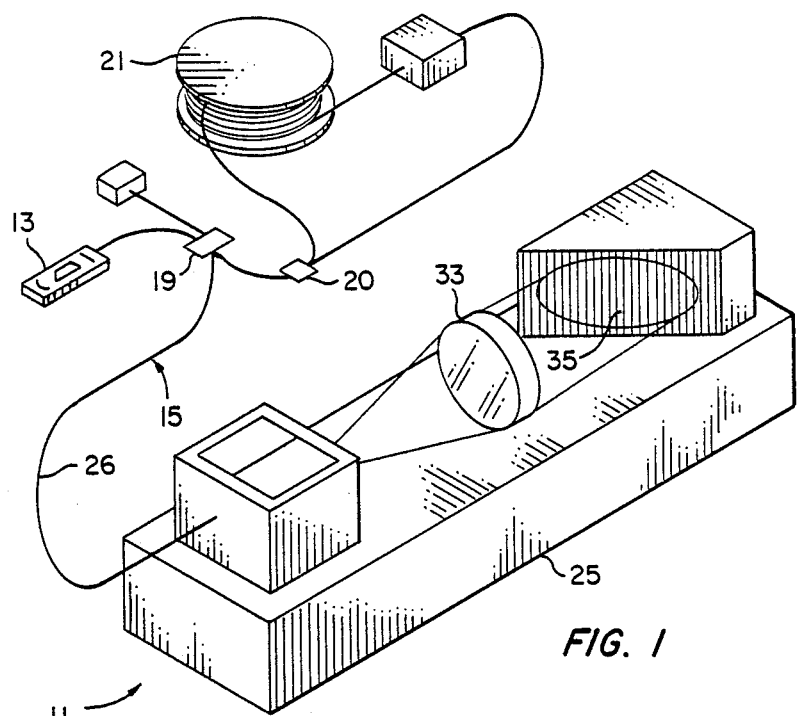
FIG. 1 schematically shows the use of the present invention in association with a fiber optic gyroscope.

The present invention is advantageously used in association with a fiber optic gyroscope (FOG) 11, schematically shown in FIG. 1. The FOG consists of a laser source 13, a series of optical fibers 15, a phase modulator 17, a detector 18 and a pair of couplers 19, 20. The light source of choice is a broadband AlGaAs superluminescent diode (SLD).

A portion of the optical fibers 15 are wound into a loop 21. Light passing through the fibers 15 within the loop 21 are affected by rate to produce a Sagnac phase shift when retroreflected back into the loop 21. The detector 18 used in order to detect the Sagnac phase shift which can be corrected with the phase modulator 17. The degree of correction by the phase modulator 17 is used to provide an indication of rate.

Light from the laser source 13 transmitted through the optical fibers 15 is directed to the frequency monitor 25 by a single mode fiber optic pigtail 26, part of the optical fibers 15. In order for the FOG 11 to measure rate accurately, the wavelength of the light source 13 must be held constant. The frequency monitor 25 is used to provide necessary control signals to control the frequency output of the light source 13.

Figure 2:
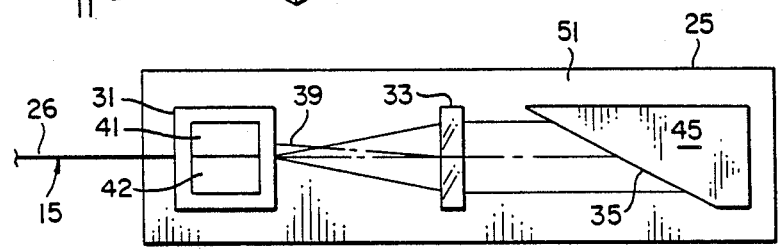
FIG. 2 shows the optical arrangement of the present invention.

FIG. 2 shows a preferred configuration of the wavelength monitor 25. Light from the pigtail 26 is directed into the wavelength monitor through a beam splitter cube assembly 31. The light then passes through a collimating lens 33 to a diffraction grating 35. The grating 35 is retroreflective at a preferred wavelength as a result of the grating 35 being blazed and with the appropriate grating constant. The gratiny preferred wavelength is the mean frequency provided by the laser source 13, and the grating 35 is aligned to be retroreflective at that wavelength. If the wavelength of light impinging upon the grating 35 deviates from the mean wavelength, the light which impinges at an on-axis 37 condition will be caused to deviate from the on-axis (37) as represented in FIG. 2 by off-center axis 39.

If the light reflected from the blazed grating 35 is on-axis (37), implying that the retroreflective light at the preferred frequency, the beam splitter 31 will evenly divide the retroreflective light. On the other hand, if the retroreflective light is off-axis (37), the beam splitter 31 will unevenly divide the retroreflective light. The beam splitter 31 includes a pair of optical sensors 41, 42. The sensors 41, 42 are aligned so that they provide balanced outputs when light is directed through the beam splitter 31 impinges upon the blazed grating 35 and is retroreflected on-axis (37). If, however, the retroreflected light is off-axis, the optical sensors 41, 42 will produce uneven outputs, representative of the uneveness of the beam splitting of the retroreflected light by the beam splitter 31. Light supplied to the wavelength monitor 25 is on-axis (37) but the imbalance of the off-axis retroreflected light causes the outputs of the sensors 41, 42 to become uneven, thereby providing an appropriate indication of a wavelength shift.

The blazed grating 35 provides an output which when the frequency of the light impinging the blazed grating 35 is affected by a wavelength shift. When the light wavelength is shifted, the output is off-axis, corresponding to whether the wavelength of light impinging upon the blazed grating 35 is above or below the mean wavelength. Therefore, the optical sensors become unbalanced in different directions, corresponding to the increase or decrease of wavelength deviation of the light from the mean wavelength.

Figure 3:
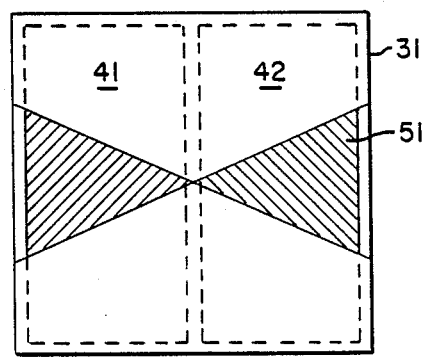
FIG. 3 shows the details of a beam splitter with an opaque mask.

The optical sensors 41, 42 provide outputs which should be weighted linearly according to wavelength. Such a weighting may be accomplished by using an array detector, with many small photosites, and mathematically weighting the signals on each photosite. A second, preferable method is to apply an "x"-shaped opaque mask 51 to the bicell detector face, as shown in FIG. 3. The mask 57 would provide weighting such that when the signals of the two detector elements 41, 42 are balanced, the mean wavelength is centered between them.

Referring to FIG. 1, the outputs of the optical sensors 41, 42 are used to control the phase modulators 17 thereby adjusting the frequency provided by the optical fibers 15 to the wavelength monitor 25 to a preferred frequency.

Figure 4:
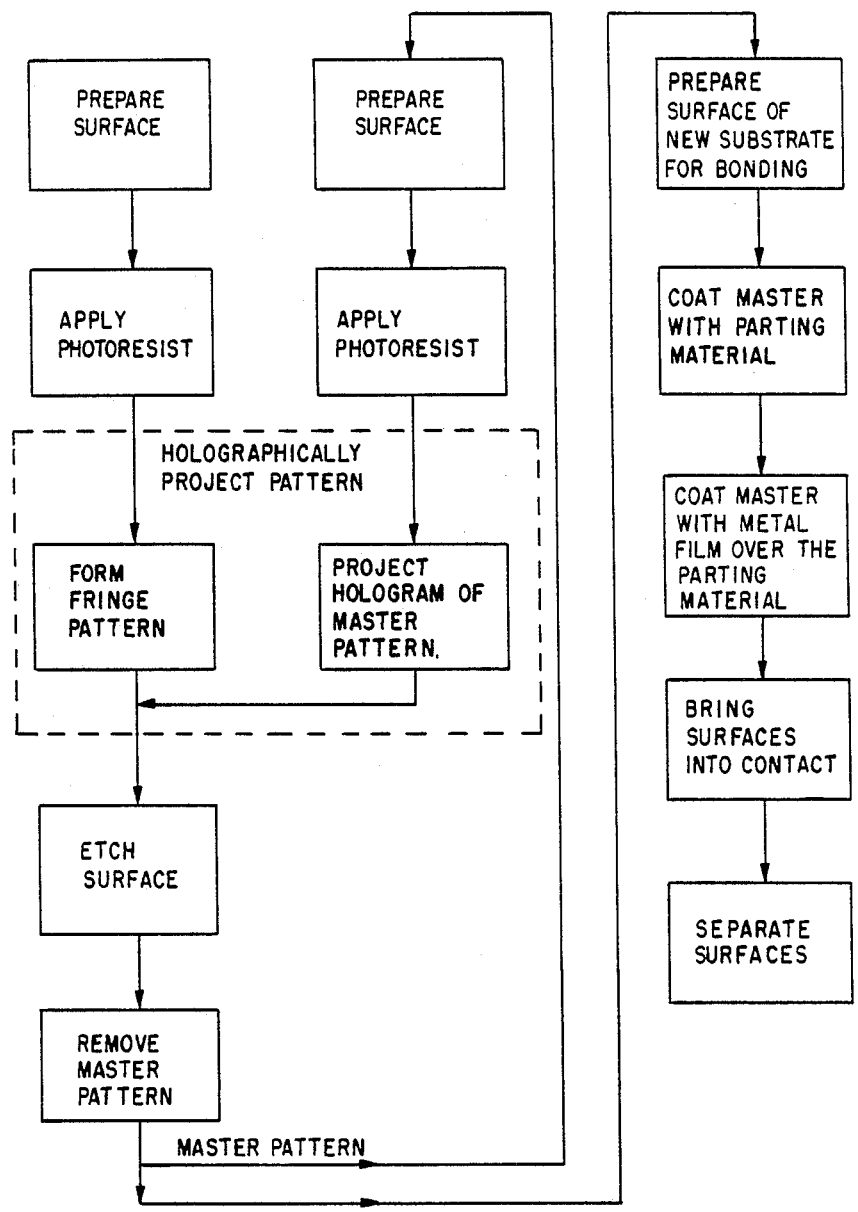
FIG. 4 is a block diagram showing steps employed in the manufacture of diffraction grating.

FIG. 4 shows the steps taken to produce blazed diffraction gratings used with this invention. In order to prepare a satisfactory blazed reflective diffraction grating, it is necessary to establish a pattern in which successive grating lines are evenly spaced in order to provide good dispersion stability and which is free of scatter and ghost images. Referring to FIG. 4, this is accomplished by first preparing a surface. Preparation of the surface includes polishing the surface. A photoresist material is then applied to the polished surface.

The photoresist is exposed to light which is projected in an even fashion in order to form a pattern spatially corresponding to a desired grating pattern. This can be accomplished by holographic techniques such as forming a fringe pattern from a pair of coherent light beams. If an original pattern has previously been developed, this original pattern can be holographically projected onto the photoresist surface, thereby avoiding the necessity of establishing a fringe pattern on the surface. This is significant because the fringe pattern must be stabilized sufficiently long to expose the photoresist in its desired pattern. The photoresist, after having been holographically developed, exhibits an exposure pattern corresponding to a desired grating, in which the gratings are evenly spaced. The polished surface is then etched according to the pattern on the photoresist in order to form a desired blazed reflective diffraction grating. The etching process using the exposed photoresist is accomplished by techniques known to those skilled in the art of photoetching electronic circuit elements. After etching, any remaining photoresist is removed.

Once the surface has been etched, a reflective diffraction grating appears on the surface, wherein the surface has been formed by blaze-of-grating techniques. As mentioned, it is possible to project a hologram of this surface in order to more easily photoetch a second surface with is a copy of the original. These surfaces can be used as diffraction gratings or, alternatively, may be used as master patterns to form duplicate diffraction gratings on new surfaces. In order to perform more effectively as diffraction gratings, it is, of course, important to coat the surface with a reflective coating material, although, when used as a master pattern, such coating is used only for transfer purposes.

Is also possible to produce a precisely patterned original pattern which is scaled to a larger (or smaller) wavelength. The holographic projection of the original pattern is appropriately scaled down in order to produce an etched pattern of the appropriate shorter wavelength. Whether or not the original pattern is scaled down, the original pattern may be an actual diffraction grating or a photographic image of a diffraction grating, as long as the image of the desired diffraction grating may be holographically projected onto a surface to be etched.

The etched grating may thereby be used as a master pattern in order to replicate the diffraction grating pattern.

In order to reduce cost, it desired to produce blazed diffraction gratings which are replicates of the original. This is accomplished by first preparing the surface of a new substrate upon which a replicate diffraction grating is to be deposited. The new substrate should be polished to have an optically smooth surface and must be sufficiently clean to accept a bonding agent such as epoxy. A master pattern of the diffraction grating is coated with a parting material such as magnesium fluoride and is then is coated with a metal film over the parting material. A preferred metal film is silver because of its high reflectivity. The metal film, as coated onto the master, exhibits a replicate blazed diffraction grating, with a high reflectivity. The blazed grating on the metal film faces the surface of the master, rather away from the surface. Before the epoxy has had a chance to set, the epoxy surface is brought into contact with the coated surface of the master pattern. After the surfaces have hardened, they are then separated and the metal film applied to the master pattern is now bonded to the new substrate. A portion of the parting material remains on the metal surface and is believed to offer some protection from corrosion.

Despite the use of parting material, it is believed that Van der Walls forces will cause the master and replicate to remain bonded together. For this reason, it is anticipated that it will be necessary to thermally shock the master apart from the replicate in order to cause the master and replicate to part.

In this manner, the replicate is readily produced by coating techniques, while relying upon the originally photoetched pattern of the master. The replicate is believed to exhibit a more efficient blazed reflectivity than the master. The exposed reflective surface is a surface which is directly mated with the master over the parting material, rather than a surface of the metal film which is opposite the photoetched surface. It is also believed that the replicates exhibit slightly smoother contours than those obtained by photoetching procedures. Therefore, the replicates have the advantage of the accuracy of the holographically photoetched pattern of the master, while being more easily formed by deposition techniques.

The replicate grating used in the wavelength monitor is preferably made of Zerodur, an ultra-low expansion material produced by Schott Glass Technologies, Inc., of Duryea, Pa. Referring to FIG. 2, the grating 35 and its Zerodur substrate 45 are mounted to a Zerodor base 51, upon which is mounted the collimating lens 33 and the beam splitter assembly 31. The beam splitter assembly 31 includes a glass cube beam splitter made of BK-7, also supplied by Schott. The Zerodur and the BK-7 are selected because they have good thermal stability, preventing deviation in frequency sensitivity and geometrical changes in the event of temperature changes.

The grating substrate 45, the beam splitter cube assembly 31 and the base 51 are preferably finely polished at their interfaces and caused to adhere to one another by Van der Walls forces. This approach avoids the use of adjustments and results in a high degree of stability of the assembled parts. It is also anticipated that the photosensors 41, 42 are cause to adhere to the beam splitter assembly 31 by Van der Walls forces. The use of Van der Walls forces is advantageous in that, while supplemental bonding techniques may be used, the Van der Walls forces promote stability of the physical spacial relationships between the component parts.

The foregoing is a speciiic example of the construction of a blazed grating for use with an optical wavelength monitor utilizing blazed of grating techniques. Accordingly, it is desired that the invention be limited only by the appending claims.

I claim:

1. Fiber optic gyroscope including, a broadband light source, a fiber optic coil, means to detect a Sagnac phase shift as a result of light passing through the fiber optic coil and a wavelength monitor to provide a wavelength deviation signal for controlling the light source, comprising:
   (a) a blazed reflective diffraction grating;
   (b) means to transmit light from the fiber optic coil to the blazed reflective diffraction grating, said means including light collimating means capable of protecting the light onto a significant surface area of the blazed refraction grating;
   (c) a beam splitter receiving said light reflected from the refraction grating;
   (d) the light supplied to a wavelength monitor being transmitted through the beam splitter to the collimating means;
   (e) the light reflected into the beam splitter being transmitted through the collimating means in a manner which focuses the reflected light into the beam splitter;
   (f) optical sensor means to detect an unbalanced state of the light entering the beam spliter; and
   (g) the light reflected from the blazed diffraction grating being retroflected through the collimating means back to the beam splitter so that the optical sensor means detects an offaxis condition of the reflected light.

2. Fiber optic gyroscope as described in claim 1, further characterized by:
   the collimating means being a collimating lens.

3. Fiber optic gyroscope as described in claim 1, further characterized by:
   (a) the diffraction grating and the beam splitter each having means for mounting;
   (b) a base upon which the diffraction grating and the beam splitter are mounted;
   (c) the base and each means for mounting having mating surfaces, wherein the base and each means for mounting are mated; and
   (d) the mating surfaces being polished sufficiently for each of said means for mounting adhering to the base by Van der Walls forces to secure each means for mounting to the base.

4. Fiber optic gyroscope as described in claim 3, further characterized by:
   the mating surfaces further being secured by the use of a bonding material.

5. Fiber optic gyroscope as described in claim 1, further characterized by:
   the broadband light source being a superluminescent diode.

6. Fiber optic gyroscope as described in claim 5, further characterized by:
   means to effect a control signal in response to the detection of an unbalanced state of light entering the beam splitter, wherein the control signal is used to control the light frequency of the coherent light source.

7. Fiber optic gyroscope as described in claim 1, further characterized by the blazed diffraction grating being formed by:
   (a) preparing a surface of a master grating;
   (b) applying a photoresist material to the surface;
   (c) holographically generating a pattern corresponding to a grating pattern to be etched into the master surface;
   (d) projecting the holographically generated pattern onto photoresist so as to expose the photoresist;
   (e) etching the master surface in order to contour the surface in accordance with the diffraction pattern as represented by the exposed photoresist;
   (f) removing any remaining photoresist from the master surface;
   (g) depositing a parting material on the master surface;
   (h) coating of the master surface with a reflective material, the reflective material being coated over the parting material;
   (i) preparing a surface of a new thermally stable substrate so as to permit the reflective material to be bonded to the new substrate;
   (j) bringing the surface of the new substrate into contact with the coated surface of the master; and
   (k) separating the surfaces in a manner which results in the reflective coating material remaining bonded to the new substrate and becoming separated from the master.

8. Interferometer including a coherent light source generating coherent light, a wavelength monitor, and means to conduct the coherent light to the wavelength monitor, characterized by the wavelength monitor including:
   (a) a blazed reflective diffraction grating formed by preparing a master surface having a blazed diffraction grating pattern thereon, depositing of a parting material on the master, coating of the master with a reflective material, the reflective material being coated over the parting material, preparing a surface of a new substrate so as to permit the reflective material to be bonded to the new substrate, bringing the surface of the new substrate into contact with the coated surface of the master, and separating the surfaces in a manner which results in the reflective coating material remaining bonded to the new substrate and becoming separated from the master;
   (b) means to transmit light to the blazed reflective diffraction grating, said means including light collimating means capable of protecting the light onto a significant surface area of the blazed diffraction grating;
   (c) a beam splitter receiving said light reflected from the diffraction grating;
   (d) the light supplied to a wavelength monitor being transmitted through the beam splitter to the collimating means;
   (e) the light reflected into the beam splitter being transmitted through the collimating means in a manner which focuses the reflected light into the beam splitter;
   (f) optical sensor means to detect an unbalanced state of the light entering the beam spliter; and
   (g) the light reflected from the blaze diffraction grating being retroflected through the collimating means back to the beam splitter so that the optical sensor means detects an offaxis condition of the reflected light.

9. Interferometer as described in claim 8, further characterized by:
   the collimating means being a collimating lens.

10. Interferometer as described in claim 8, further characterized by:
    (a) the diffraction grating and the beam splitter each having means for mounting;

(b) a base upon which the diffraction grating and the beam splitter are mounted;

(c) the base and each means for mounting having mating surfaces, wherein the base and each means for mounting are mated; and (d) the mating surfaces being polished sufficiently for each of said means for mounting adhering to the base by Van der Walls forces to secure each means for mounting to the base.

11. Interferometer as described in claim 10, further characterized by:

the mating surfaces further being secured by the use of a bonding material.

12. Interferometer as described in claim 8, further characterized by:

the coherent light source being a superluminescent diode.

13. Interferometer as described in claim 12, further characterized by:

means to effect a phase modulation in response to the detection of an unbalanced state of light entering the beam splitter, wherein the phase modulation is used to measure detected rate.

* * * * *